(12) United States Patent
Vikhagen (10) Patent No.: US 9,964,432 B2
(45) Date of Patent: May 8, 2018

(54) METHOD OF VIBRATION MEASUREMENT AND INTERFEROMETER

(71) Applicant: Optonor AS, Trondheim (NO)

(72) Inventor: Eiolf Vikhagen, Trondheim (NO)

(73) Assignee: Optonor AS, Trondheim (NO)

(*) Notice: Subject to any disclaimer, the term of this patent is extended or adjusted under 35 U.S.C. 154(b) by 195 days.

(21) Appl. No.: 14/648,378

(22) PCT Filed: Dec. 4, 2013

(86) PCT No.: PCT/NO2013/050214
§ 371 (c)(1),
(2) Date: May 29, 2015

(87) PCT Pub. No.: WO2014/088424
PCT Pub. Date: Jun. 12, 2014

(65) Prior Publication Data
US 2015/0308887 A1    Oct. 29, 2015

(30) Foreign Application Priority Data
Dec. 5, 2012  (NO) .................................. 20121458

(51) Int. Cl.
*G01B 9/02* (2006.01)
*G01H 9/00* (2006.01)
*G01J 9/02* (2006.01)

(52) U.S. Cl.
CPC .  *G01H 9/00* (2013.01); *G01J 9/02* (2013.01)

(58) Field of Classification Search
CPC .. G01H 9/00; G01J 9/02; G01V 1/003; G01B 11/2441; G01B 9/02094
See application file for complete search history.

(56) References Cited

U.S. PATENT DOCUMENTS 5,229,832 A     7/1993  Gaynor
8,111,403 B2 *  2/2012  Schuessler ............... G01H 9/00
                                                        356/502

(Continued)

FOREIGN PATENT DOCUMENTS

WO       0014477 A1    3/2000

OTHER PUBLICATIONS

International Search Report and Written Opinion dated Mar. 26, 2014 (PCT/NO2013/050214).

*Primary Examiner* — Kara E Geisel
*Assistant Examiner* — Maurice Smith
(74) *Attorney, Agent, or Firm* — Alix, Yale & Ristas, LLP (57) ABSTRACT

Method and system for measuring vibration in two or three directions in objects (12) by using three illumination light beams (11A-C) for measurement of in-plane vibrations in two directions, where one of the three illumination light beams (11A-C) is common for the two in-plane measurements, and where the three illumination light beams (11A-C) are configured to provide free space at one side of the object (12) for easier access to the object. The method and system is further arranged for using two illumination light beams (30A-B) for measuring vibrations in the object (12) in a third direction, which third direction is out-of-plane direction, where one illumination light beam (30A) is illuminating the object (12) through an imaging objective (16) and one illumination light beam (30B) is used as reference beam.

17 Claims, 7 Drawing Sheets

(56) References Cited

U.S. PATENT DOCUMENTS

| | | |
|---|---|---|
| 2003/0037616 A1 | 2/2003 | Vikhagen |
| 2004/0059526 A1* | 3/2004 | Toyooka .............. G01B 11/162 702/57 |
| 2008/0007715 A1* | 1/2008 | Meldahl ................... G01H 9/00 356/72 |
| 2008/0316496 A1* | 12/2008 | Meldahl ................... G01H 9/00 356/498 |
| 2009/0027688 A1* | 1/2009 | Pouet ................ G01N 29/2418 356/502 |
| 2009/0153825 A1* | 6/2009 | Edart ................. G03F 7/70633 355/67 |
| 2011/0102806 A1* | 5/2011 | Meldahl ............. G01B 11/2441 356/511 |

* cited by examiner

METHOD OF VIBRATION MEASUREMENT AND INTERFEROMETER

The disclosure relates to a method of vibration measurement and an interferometer. Especially, this disclosure relates to a method of measuring vibrations in two or three directions and describes an interferometer for performing the method.

BACKGROUND

Presently there are a number of optic interferometry techniques and instruments for measuring geometric sizes, such as distance, surface form, dimensions, movement and vibration Norwegian patent 314323 and its patent family is one example which describes hardware and algorithms to measure vibrations in small structures using an interferometer and using so-called time average recordings. This is a two-dimensional solution with a single sensitivity direction for the measurement.

Three-dimensional vibration recordings and systems for three-dimensional measurements are known in prior art.

A main problem with three-dimensional measurements is to measure and find the vibration phase relation between different directions. If the object vibrates with a steady state vibration with constant frequency and amplitude, it is possible to measure vibrations in one direction at a time, for instance in the X-direction first, then in the Y-direction and finally in the Z-direction. But to find the phase relation between the different directions and different measurements may be difficult.

One way to solve this is by performing measurements in the different directions simultaneous at the same time, and to get the temporal relation between different measurements.

Figure 1:
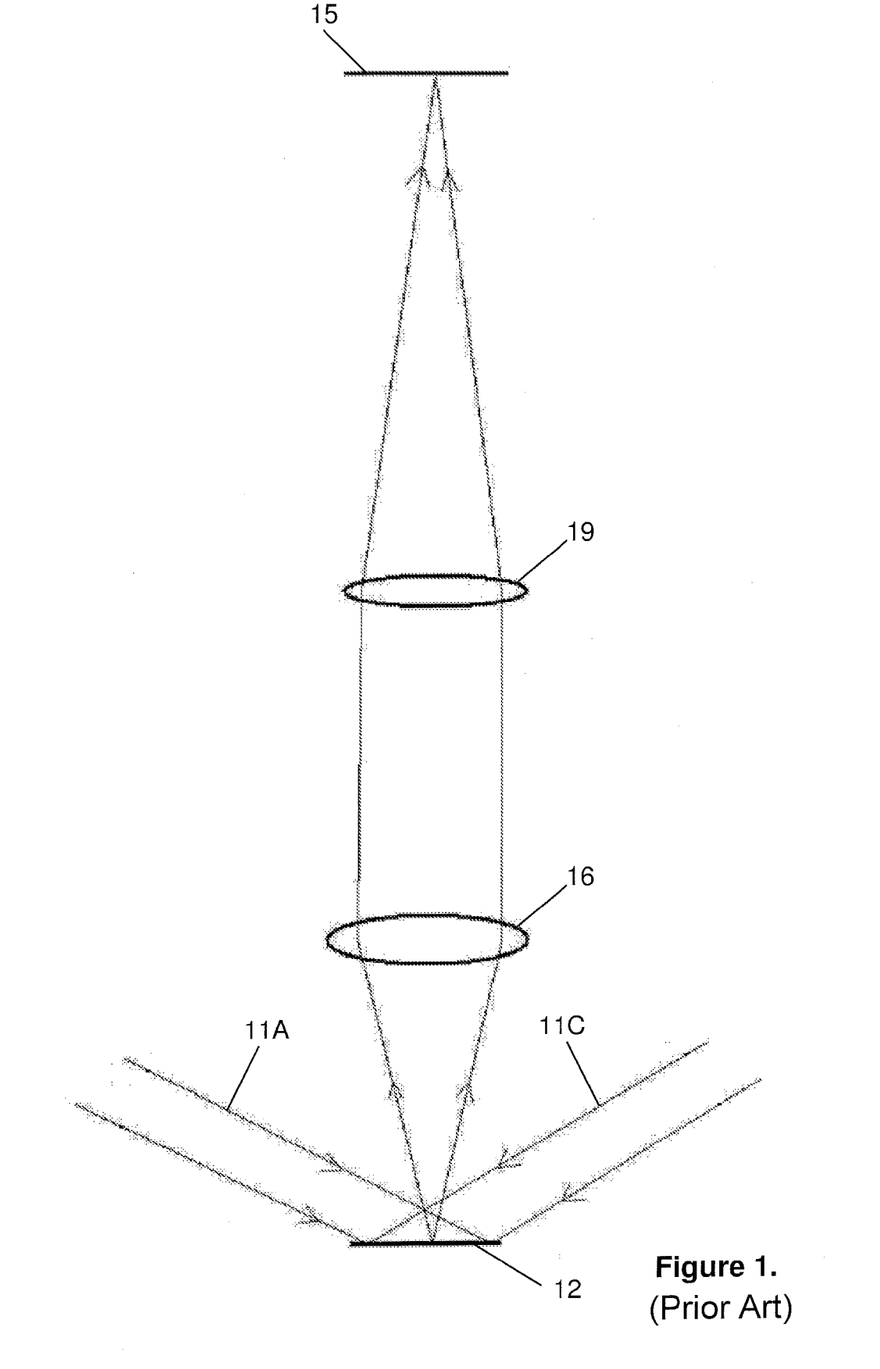
FIG. 1 shows a typical setup for in-plane measurements according to prior art.

If the object under investigation is imaged from a specific direction, most interferometric systems measure vibrations in this observation direction, for instance as described in the applicant's Norwegian patent 314323. The illumination of the object, done with a laser beam or with another (partly) coherent light source, will then be in-line with the observation direction. For in-plane measurements, where the sensitivity direction is perpendicular, or at least with a component perpendicular, to the observation direction, the illumination normally comes from another direction than the observation direction, when interferometric methods are used. A typical prior art setup for in-plane measurements with a sensitivity direction perpendicular to the observation direction, consist of two illumination light beams from each side, as shown in FIG. 1. In this case, no internal reference beam is required in the interferometer, as interference and interferometric sensitivity is achieved by interference between the two illumination light beams.

With the setup in FIG. 1, measurements can be done in one in-plane direction. The normal procedure will then be to illuminate the object by two other light sources from other directions, to achieve sensitivity in the other in-plane direction. The two first light sources can also be moved to new positions for this second recording. A disadvantage with this way to perform in-plane measurements in two directions is the need for space for illumination sources in different directions around the object under investigation.

Prior art solutions further suffer from low free space available at one side of the object to be investigated and difficult access to the object for the user.

If four illumination light beams are being used, two at a time, or alternatively, all four at the same time, for in-plane measurements in two directions, it may also be complicated to find the phase relation between the measurements in the two in-plane directions.

There are also some systems for in-plane measurement based on principles with stroboscopic illumination or stroboscopic imaging. These systems have problems with the measurement of high frequencies and also problems with limited amplitude resolution.

There is accordingly a need for a method and interferometer which can be used for both two-dimensional recordings and full three-dimensional recordings of vibrations in small and microscopic objects.

There is accordingly a need for a method and interferometer which are capable of performing both in-plane measurements and out-of-plane measurements.

The disclosed embodiments provide a method and an interferometer which solves the above mentioned problems with prior art.

The disclosed embodiments also provide a method and interferometer arranged for providing measuring of vibrations in two or three directions in objects.

Also provided is a method and interferometer providing vibration phase relation between the two in-plane directions.

Also provided is a method and interferometer also providing vibration phase relation between the two in-plane directions and a third out-of-plane direction.

Also provided is a method and an interferometer also providing free space at one side if the investigated object to provide easier access to the object for the user.

Also provided is a method and an interferometer for measuring an object with two or more sensitivity directions, one at a time, where the object is illuminated by one or more coherent illumination light beams at a time.

Also provided is a method and an interferometer capable of performing both in-plane measurements and out-of-plane measurements.

Also provided is a method and an interferometer which use three illumination light beams for in-plane measurements, where one of the three illumination light beams is common for in-plane measurements in two directions.

Also provided is a method and an interferometer arranged for using two illumination light beams for measurement in an out-of-plane direction, and where one of the two illumination light beams is used as a reference beam.

Also provided is a method and an interferometer arranged for phase modulation of illumination light or reference beam for out-of-plane measurements.

Also provided is a method and an interferometer arranged for translation and/or rotation of diffusors in illumination light beam paths to provide changes in speckle patterns.

Also provided is a method and an interferometer providing full three-dimensional recordings of vibrations in especially small and microscopic object, which also is applicable on larger structures.

The disclosure also concerns using phase modulation and time average recordings to be able to measure at high frequencies in all directions (in-plane and out-of-plane).

The disclosure provides a method and an interferometer for measuring vibration in two or three directions for an object under investigation.

More particularly, provided herein is a method and an interferometer which involves the use of an imaging system in an interferometric configuration, where an object is illuminated from different directions in turn, to obtain measurements with sensitivity in three directions, preferably X-, Y- and Z-directions in a coordinate system.

This will provide full three-dimensional vectorial vibration displacement of the object under investigation.

According to the disclosure the object can be imaged onto a detector array, which e.g. can be a ccd array.

The object is vibrating at one frequency at a time, and the object vibration excitation is arranged to be controllable by a control unit arranged to the interferometer.

According to the disclosure the object is vibrating over a certain period of time with constant frequency and constant amplitude. The measurement takes place over this period of time, which can last from less than a second and up to several minutes.

So-called time average recording is utilized, where a detector array exposes over one or many vibration periods, but the disclosed method and device can also be used with recording principles involving short exposure time compared to the vibration period. The object is measured with two or more sensitivity directions, one at a time, where the object is illuminated by one or more coherent illumination light beams at a time. Within a XYZ coordinate system, measurements are preferably performed in the X- and Y- and Z-direction, in turn. If the XY-plane represents the in-plane directions for the object, and the Z-direction represents the out-of-plane direction, then the Z-measurement is performed by illuminating the object with a single illumination light beam and also by the use of a reference beam in addition, which is expanded to illuminate the detector array directly.

For in-plane measurements, two illumination light beams are used for the X-direction, and two illumination light beams are used for the Y-direction, where one illumination light beam is common for the two directions.

The disclosed interferometer preferably includes a modulator and a control unit. The control unit controls the excitation of the object and also controls a reference modulator at the same time. The modulator works like a temporal reference for signals applied for object excitation and measurement in all directions X, Y and Z.

Accordingly, described herein is a method and interferometer which can be used for both two-dimensional recordings and full three-dimensional recordings of vibrations in small and microscopic objects. They can also be used on larger structures.

A method of measuring vibrations in two or three dimensions in objects accordingly includes using three illumination light beams for measurement of in-plane vibrations in two directions, where one of the three illumination light beams is common for the two in-plane measurements, and where the three illumination light beams are configured to provide free space at one side of the object for easier access to the object for the user.

The method can further use two illumination light beams for measuring vibrations in the object in a third direction, which third direction is out-of-plane direction, where one illumination light beam is illuminating the object through an imaging objective and one illumination light beam is used as reference beam.

The method can further include using an algorithm where the object is excited with one frequency at a time, and where one or more phase modulators are used to provide a dynamic phase modulation of one of the two illumination light beams being used for each recording in each direction.

The method can further include using the same modulator for the two in-plane measurements as one of the illumination light beams are phase modulated and this illumination light beam is common for the two in-plane measurements.

The method can further include using the same, or a different phase modulator for the measurement in the third out-of-plane direction, where the modulator also phase modulates one of the two illumination light beams used for out-of-plane measurements.

The method can further include using optical diffusors in the illumination light beams for in-plane measurements, and moving the diffusors by translations and/or rotations to obtain changes in speckle patterns in the illumination light beams.

The method can further include using an optical diffusor in the object illumination path for the out-of-plane measurement, and moving the diffusor by translations and/or rotations to obtain changes in speckle pattern in the illumination light beam.

The method can further include using a polarizing beam splitter and a retarder plate or quarter plate in the illumination path for the out-of-plane measurement for avoiding that reflections from the objective lens reach the detector array.

The method can further include using a full field detector array for detection of signals in the interferometer.

The method can further include performing multiple recordings, where each recording is performed with different levels of intensity in illumination light beams and in detector array images.

The method can further include using an algorithm where signals used for different points or areas of an imaged area are selected from different recordings with different levels of intensity, as described above, for obtaining good or acceptable signals from all points, or most of the points, on the object surface.

The method can further include performing measurement of vibrations in three, alternatively two, separate directions using the same modulator signal as temporal reference for the three- or two-dimensional measurements.

The method can further include using a steady state object excitation with constant amplitude and frequency for the object during the recording in three or two directions.

The method can further include combining the three or two dimensional measurements to achieve a full three or two dimensional displacement vector for all points on the imaged surface for object frequency and amplitude used in the three or two dimensional measurements.

The method can further include plotting a full three- or two-dimensional animation of the object surface displacement.

BRIEF DESCRIPTION OF THE DRAWINGS

The invention will now be described in further detail with reference to the attached drawings, where.

DETAILED DESCRIPTION

Reference is now made to FIG. 1 which shows a typical setup of an interferometer for in-plane measurements according to prior art, with a sensitivity perpendicular to the observation direction. The interferometer includes at least one illumination source (not shown), such as a coherent light source in the form of a laser, for illuminating an object 12 with two illumination light beams 11A and 11C, respectively, at the same time, from each side of the object 12 to be investigated. With such an interferometer an internal reference beam is not required, as interference and interferometric sensitivity is achieved by interference between the two illumination light beams 11A and 11C. With such an interferometer one usually illuminates the object 12 by two different sets of illumination sources from different directions to achieve sensitivity in both in-plane directions, possibly by moving the two first illumination sources to another position. An interferometer further includes an imaging objective lens 16, which can typically be a microscope objective, a detector array 15, which typically can be a ccd array, and possibly a second lens 19 for focusing light reflected from the object 12 to the detector array 15. The lens 16 can also be arranged to focus the object image directly on the detector array 15 without the second lens 19.

Figure 2:
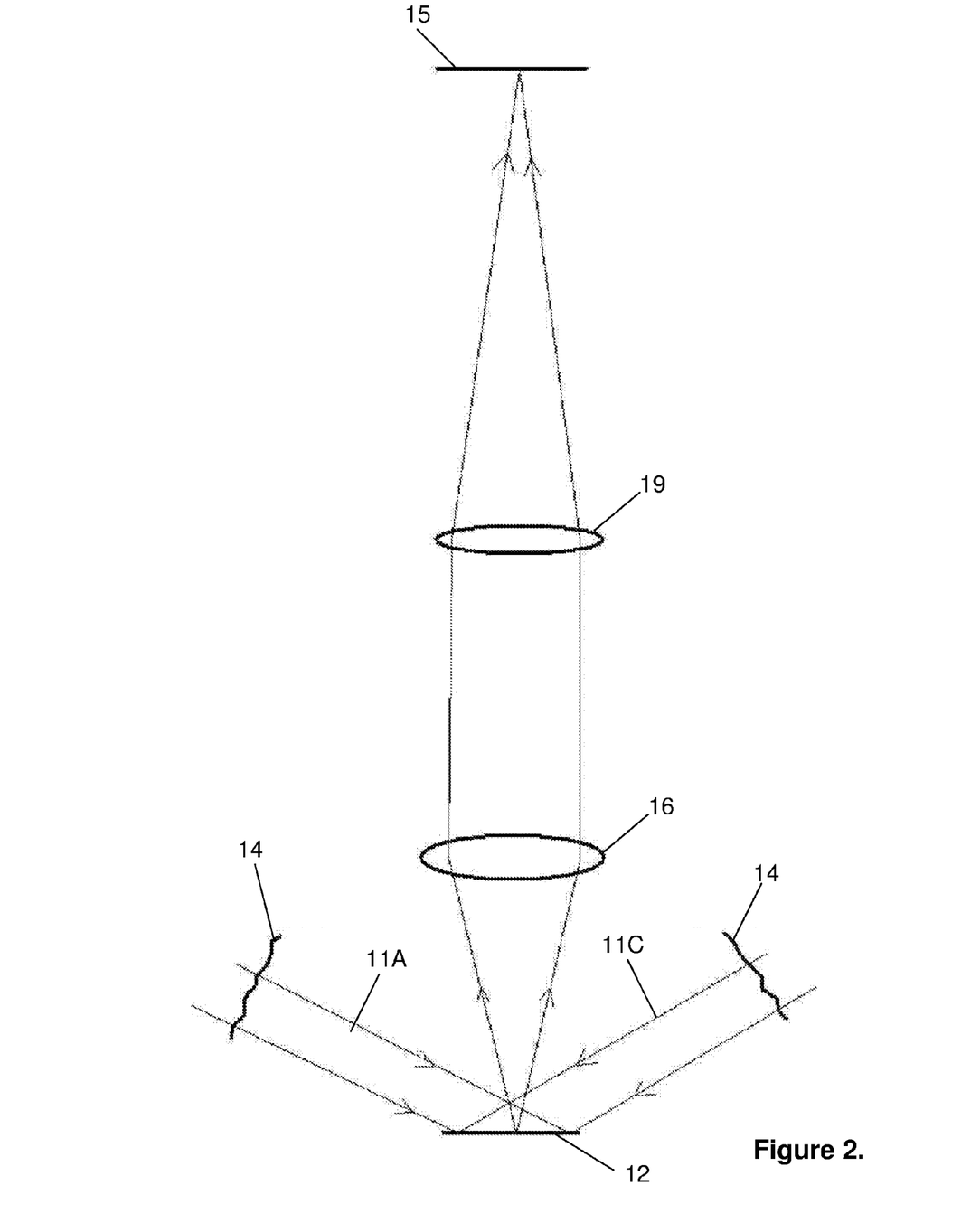
FIG. 2 shows a principle drawing for an interferometer according to a first embodiment of the disclosure.

Reference is now made to FIG. 2 which is a principle drawing according to a first embodiment. The interferometer according to the first embodiment includes the same components as described above under FIG. 1, but further includes diffusor plates 14 being movable with a translational and/or rotational movement, to change the speckle pattern in the illumination light beams 11A and 11C. The interferometer may also further include at least one control unit which usually is arranged to control phase modulation and/or phase steps of the illumination light beams 11A and 11C, controlling an excitation unit for excitation of the object 12, and controlling collection and digitalization of measuring data from the detector array 15. It should be noted that one does not use illumination light beams 11A and 11C at the same time, as in the prior art solution described in FIG. 1.

Figure 3:
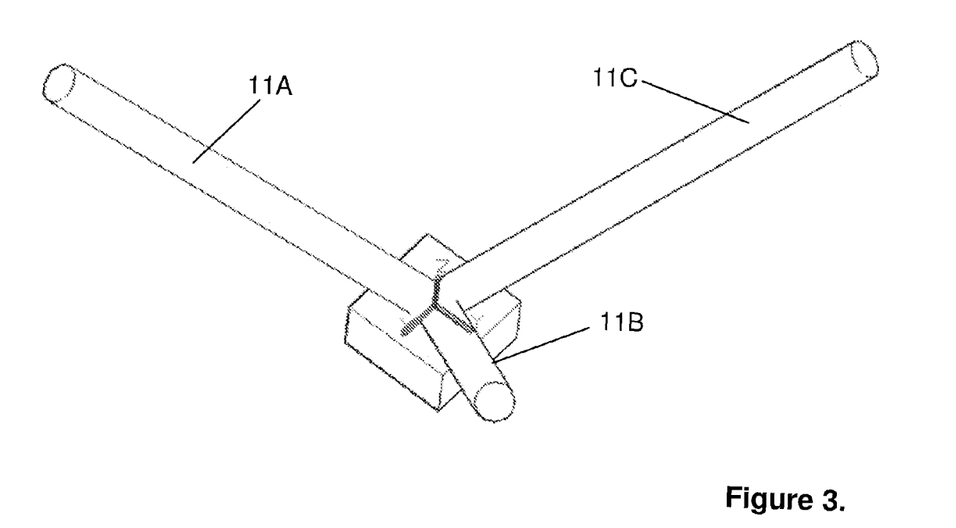
FIG. 3 is a principle drawing of in-line measurements according to the disclosure.

Reference is now made to FIG. 3 which is a principle drawing of in-plane measurements according to the disclosure, where two illumination light beams 11B and 11C are used for measurement of the object 12 in X-direction, and two illumination light beams 11A and 11B are used for measurement of the object in Y-direction, where illumination light beam 11B is a common illumination light beam for the two directions. All illumination light beams 11A-C must be wide enough to illuminate the whole part of the object which is going to be measured.

Figure 4:
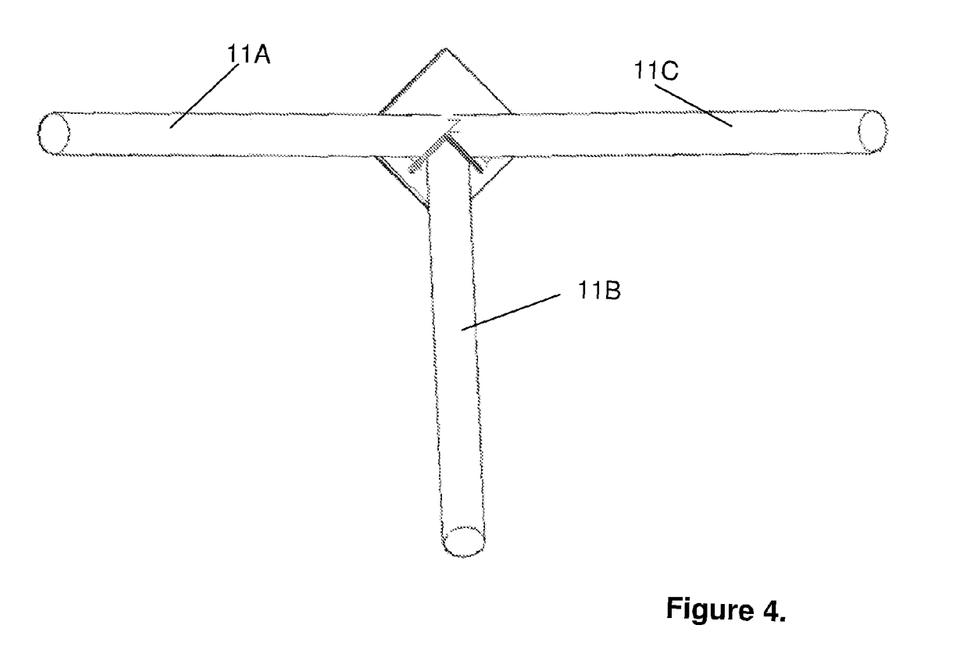
FIG. 4 shows in-line measurements as in FIG. 3, but with the projection seen from above.

Reference is now made to FIG. 4 which shows in-line measurements as in FIG. 3, but with the projection seen from above. For measurement in the X-direction, illumination light beams 11B and 11C are on, while illumination light beam 11A is turned off. For measurement in the Y-direction, illumination light beams 11A and 11B are on, while illumination light beam 11C is turned off.

As can be seen from FIGS. 3 and 4, there is free space on one side of the object 12, that is, opposite to illumination light beam 11B. Accordingly, the user is provided with easier access to the object 12.

Figure 5:
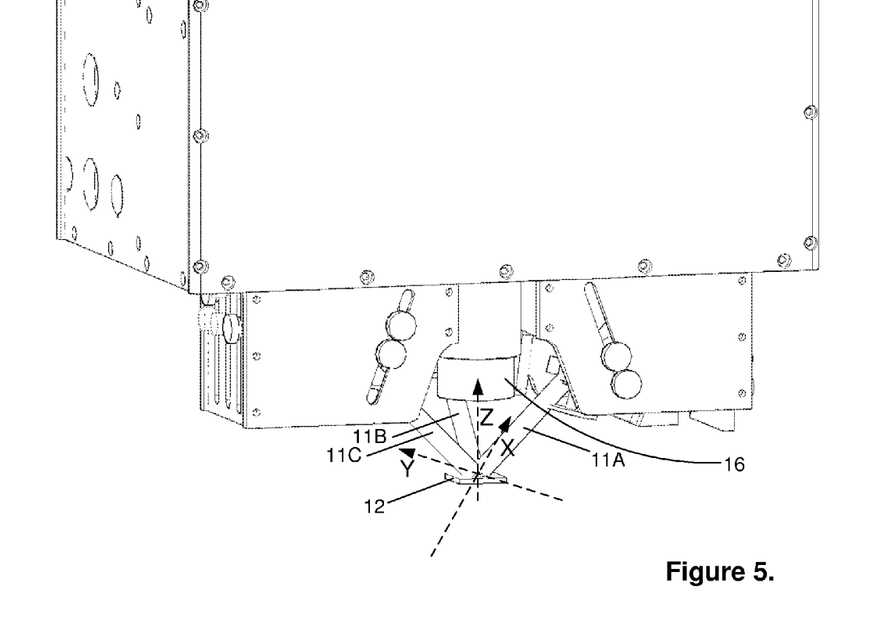
FIG. 5 shows an example of a practical design of an optical head for an interferometer according to the disclosure.

Reference is now made to FIG. 5, which shows an example of a practical design of an optical objective head for an interferometer. The figure shows a microscope objective 16 looking down on the object 12, and the three illumination light beams 11A, 11B and 11C for in-plane measurements are coming down onto the object 12. Illumination light beam 11B, which is common for X- and Y-measurements, is now the one which comes from behind. Illumination light beam 11C is to the left, and illumination light beam 11A is to the right in FIG. 5.

The illumination light beams 11A-C can have different angles of incidence toward the object 12, but most convenient is that illumination light beams 11A and 11C are opposite to each other, as seen from the above projection (FIG. 4), while illumination light beam 11B is perpendicular to illumination light beams 11A and 11C in the projection seen from the above (seen with the Z-axis as observation direction as shown in FIG. 4). The angle of incidence between the different illumination light beams 11A-C and the XY-plane may be selected to any value from close to zero degrees and up to close to ninety degrees. It will be most convenient to select the same angle between the three illumination light beams 11A-C and the XY-plane, for instance forty-five degrees or thirty degrees.

The illumination light beams 11A, 11B and 11C can be collimated, or they can also be focused to an imaginary point below or above the object surface, or the illumination light beams 11A-C can also be converging from (an imaginary) point in, or above, the illumination source.

The illumination light beams 11A-C can go through diffusor plates 14, as shown for two of the illumination light beams 11A and 11C in FIG. 2. If a diffusor plate 14 is used in the illumination as shown in FIG. 2, this diffusor plate 14 can be movable with a translational and/or rotational movement, to change the speckle pattern in the light wave obtained when the light wave has passed the diffusor plate 14.

To obtain so called speckle averaging, several exposures on a detector array 15 can be averaged, where the speckle pattern is changed between the exposures.

For measurements in the Z-direction, the object 12 is illuminated by a single beam, preferably in the Z-direction.

Figure 6:
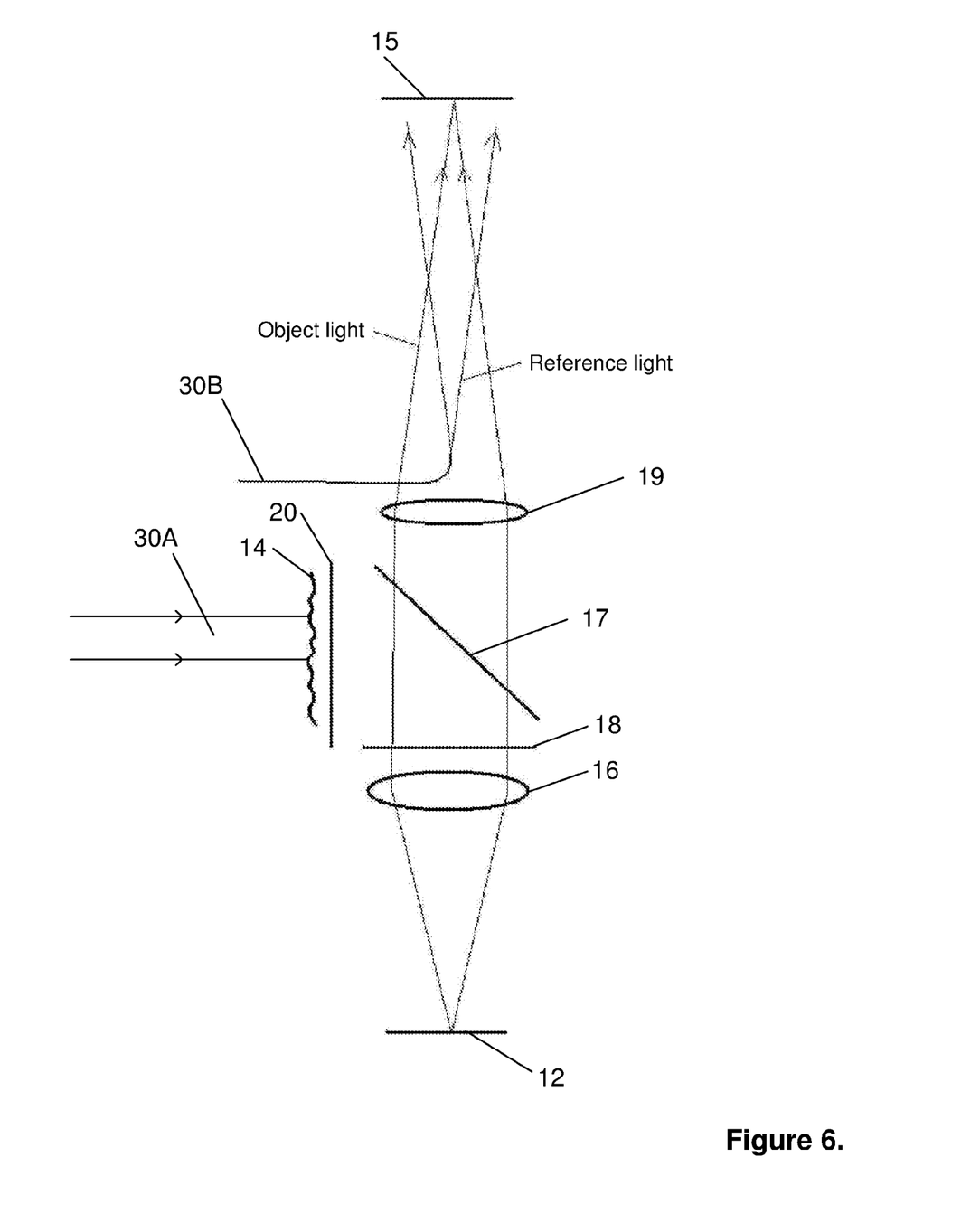
FIG. 6 is a principle drawing of vibration measurement in the out-of-plane direction according to the disclosure.

Reference is now made to FIG. 6 which is a principle drawing of vibration measurement in the Z-direction, i.e. the out-of-plane direction. The illumination is done, by means of an illumination light beam 30A, through an imaging objective lens 16, which can typically be a microscope objective. The illumination light is reflected from a cube or plate beam splitter 17, which can preferably be a polarizing beam splitter. The light is reflected towards the objective lens 16 and goes through a retarder plate or quarter plate 18 and through the lens 16 and onto the object surface. Light reflected from the object surface goes back through the objective lens 16 and through the retarder plate or quarter plate 18 and through the (polarizing) beam splitter 17 and this light is focused on the detector array 15 by a second lens 19. In an alternative embodiment the lens 16 can be arranged to focus the object image directly only the detector array 15, so that the second lens 19 can be omitted. If the beam splitter 17 is a polarizing beam splitter, a linear polarizer 20 should preferably be used before the illumination light comes to the polarizing beam splitter 17, as shown in FIG. 6. With the setup in FIG. 6, where the polarization of the illumination light is rotated ninety degrees after passing the retarder plate (quarter plate) 18 twice on the way down and up again, one avoid reflections from the objective lens 16 to reach the detector array 15, as light reflected from the objective lens 16 is reflected back towards the illumination source by the polarizing beam splitter 17.

The illumination light 30A can also go through a diffusor plate 14 before it comes to the beam splitter 17, as shown in FIG. 6. If a diffusor plate 14 is used in the illumination, as shown in FIG. 6, this diffusor plate 14 can be moved by a translational and/or rotational movement, to change the speckle pattern in the illumination light wave obtained when the illumination light wave has passed the diffusor plate 14. To obtain so-called speckle averaging, several exposures on the detector array 15 can be averaged, where the speckle pattern is changed between exposures.

Figure 7:
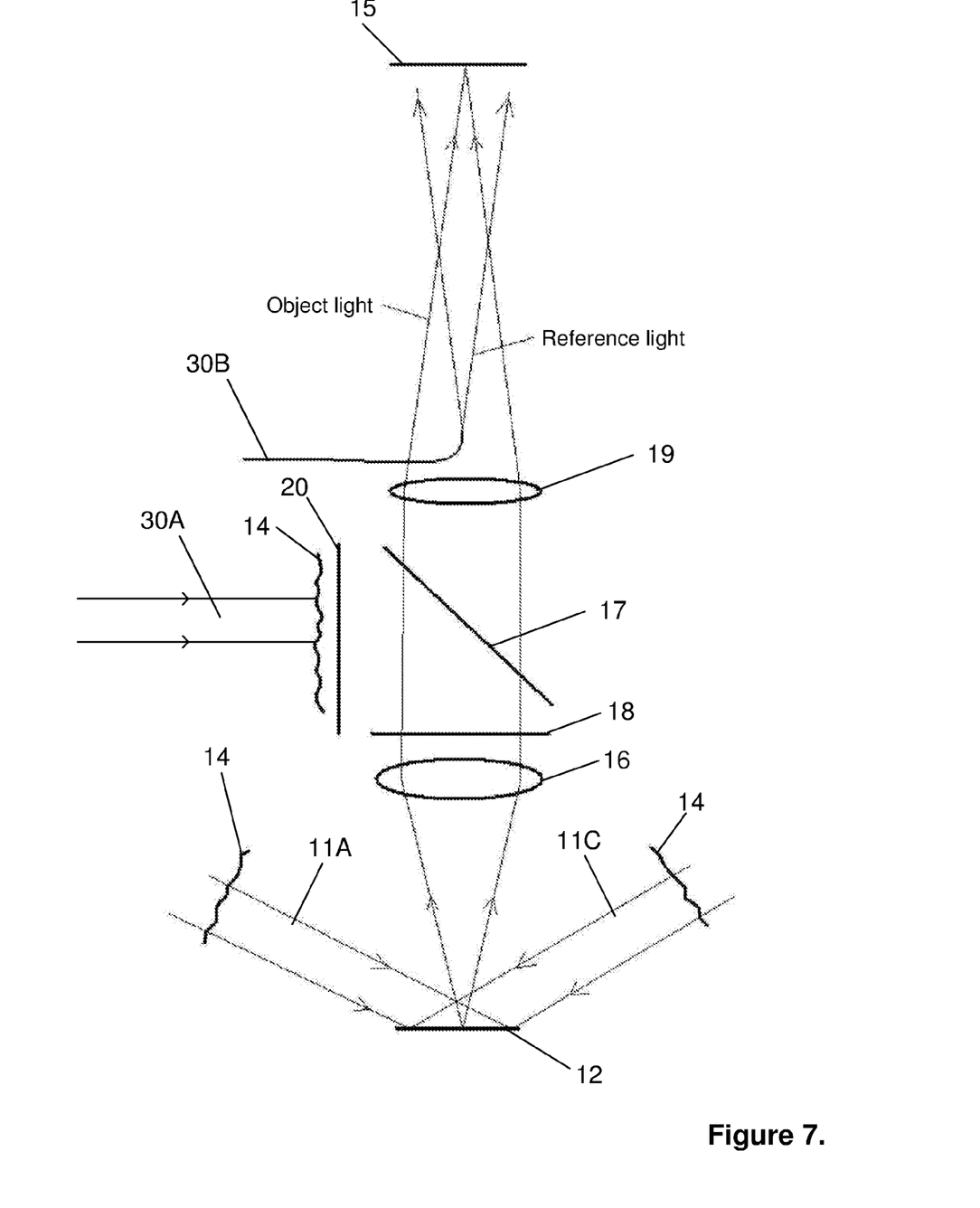
FIG. 7 is a principle drawing of vibration measurements in three directions according to the disclosure.

If the device and method is used for full three-dimensional measurements of the object 12 under investigation, the interferometric setup can be as shown in FIG. 7, where the optical configuration for both in-plane measurements and out-of-plane measurements are combined in the same interferometer. Only two of the three in-plane beams are shown in FIG. 7.

Full three-dimensional measurements of the object 12 under investigation, involves three separate measurements with different sensitivity directions. The sensitivity directions will preferably be in the X-, Y- and Z-directions with reference to FIGS. 3 to 5. The excitation of the object 12 is preferably controlled by a control unit, preferably by use of a signal generator. The control unit can also be arranged to change phase in the illumination light waves in at least two of five illumination light waves used for a full three-dimensional recording. This phase change can be dynamic, with a frequency equal to, or close to, the excitation frequency for the object 12. The phase change can also be performed in steps, to be used with so-called phase stepping algorithms. The control unit should be able to supply dynamic and stepwise phase shifts simultaneously. For all measurements (in the X-, Y- and Z-directions), two illumination light beams 11A-C, 30A-B are used for each measurements. The dynamic and stepwise phase shifts can be applied to one and the same illumination light beam 11A-C, 30A-B being used for each measurement, or the dynamic phase shift can be applied to one of the illumination light beams 11A-C, 30A-B while the stepwise phase shift can be applied to the other illumination light beam 11A-C, 30A-B.

For in-plane measurements in the X- and Y-directions, illumination light beam 11B in FIGS. 3-5, which is common for X- and Y-measurements, is preferably used for dynamic phase shift. For out-of-plane measurements in the Z-direction, any of the two light beams 30A-B involved (the illumination light beam 30A and reference beam 30B shown FIGS. 6 and 7), can be used for dynamic and/or stepwise phase shift.

During recordings performed with the time average principle, the control unit controls the excitation of the object 12 and the phase shifts in the beams 11A-C, 30A-B. The present method makes use of an algorithm where several detector array exposures (images) are acquired while the control unit controls and changes parameters like:

i) temporal phase between the object excitation and dynamic phase change in illumination light beams 11A-C, 30A-B, ii) changes the optical phase in the illumination light beams 11A-C, 30A-B, iii) changes speckle patterns created by different positions of the diffusors 14 being used, iv) changes in the exposure levels by adjusting electronical shutters, camera gain, illumination intensity, optical apertures, and similar.

The data acquired by the control unit is then being used to calculate the amplitude and phase of the object vibrations.

With angular illumination for in-plane sensitivity, some of the light reflected from the object surface needs to be diffusely reflected. If not, no light will be reflected towards the imaging lens 16. To get light reflected to the imaging lens 16, the object surface normally needs to have some roughness in surface topography. Angular illuminating of rough surfaces can often cause nonuniform intensity across the object surface, especially when observed from other directions than the illumination direction. This may be a problem in interferometric measurements, as some points or some areas of the imaged object 12 get too much light, while other points or areas get too little light for good quality measurements. The measuring principle can be based on the use of multiple recordings with different intensities in the detector image of the object 12, and where the control unit uses a spatial selection algorithm to select signals from different recordings for different points or areas. This means that some points or areas on the imaged surface are using results from one recording or exposure, while other points or areas are using results from other recordings or exposures.

When the amplitude and phase for object vibrations are measured in three different directions, the control unit can combine the three results to find the full three-dimensional vibration mode or vibration map for the object at the measured frequency.

Figure 8:
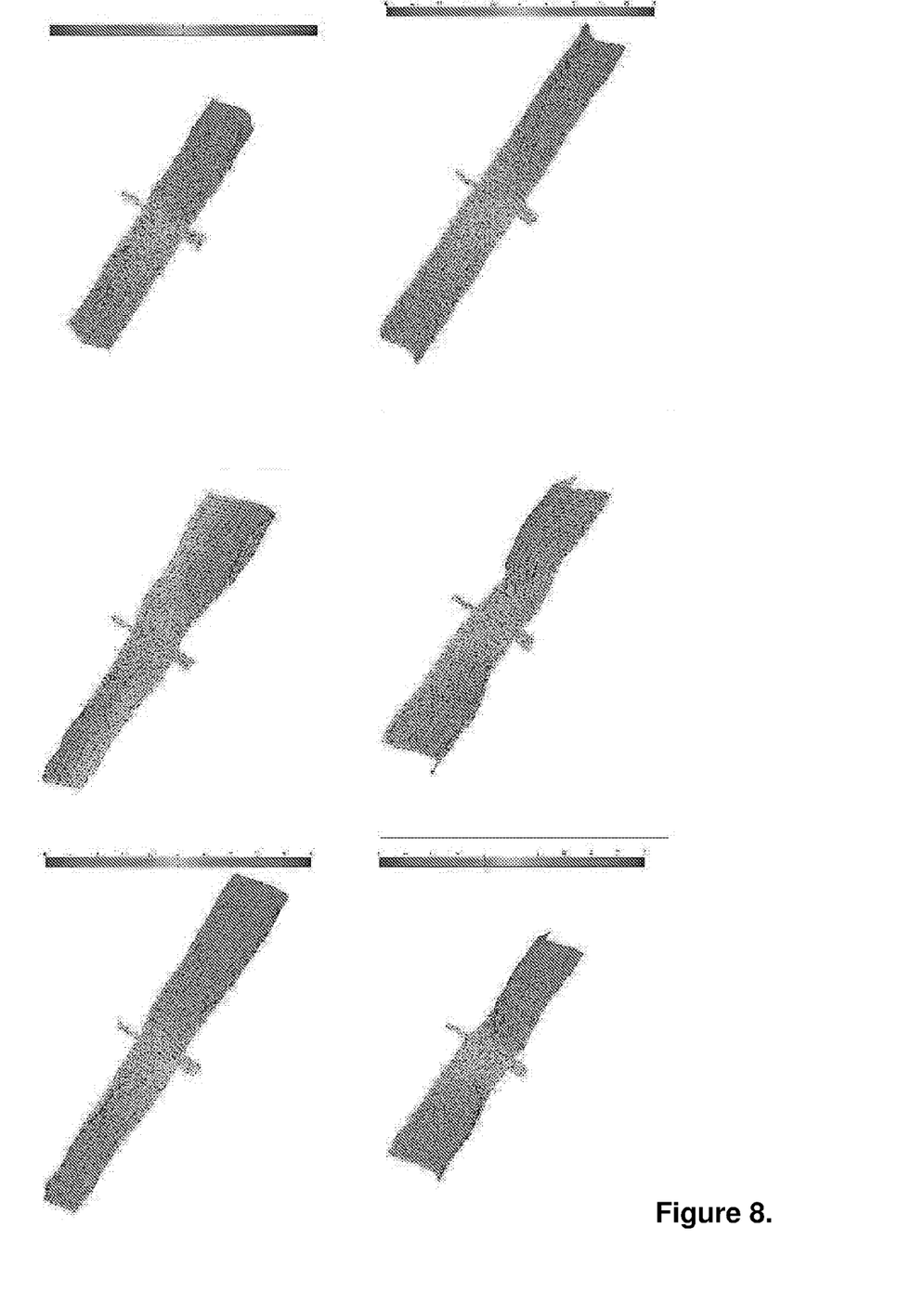
FIG. 8 is a plot of an example of a surface vibration of a small object, where the vibrations are measured in three directions X, Y and Z, and the three-dimensional vibration data is combined in a single animation of the object vibration.

The control unit can display this as animated plots like indicated in FIG. 8. In FIG. 8, six plots of the full three-dimensional object movement are shown, for different vibration phases. The control unit can create many plots like this, for instance thirty plots differentiated by twelve degrees with respect to a full 360 degrees vibration period, to show an animated display of the three-dimensional object vibration.

The device and method can also be used the same way, but for vibration recordings in two dimensions, for instance in-plane vibrations in the X- and Y-directions.

Accordingly, the control unit is provided with means and/or software for one or more of the following:

selecting signals used for different points or areas of an imaged area from different recordings with different levels of intensity, for obtaining good or acceptable signal from all points, or most of the points, on the object surface.

performing measurement of vibrations in two or three separate directions using the same modulator signal as temporal reference for the three- or two-dimensional measurements, using a steady state object excitation with constant amplitude and frequency for the object during the recording in three or two directions, combining the three- or two-dimensional measurements to achieve a full three- or two-dimensional displacement vector for all points on the imaged surface for object frequency and amplitude used in the three- or two-dimensional measurements, plotting a full three- or two-dimensional animation of the object surface displacement, storing data sets for amplitude and phase in all two or three directions.

The invention claimed is:

1. A method of measuring vibration in two in-plane directions, or two in-plane directions and one out-of-plane direction in an object (12) with an interferometer, comprising the steps of:

providing an object (12) to be measured, providing a source of three in-plane illumination light beams (11A-C), illuminating the object with the three in-plane illumination light beams (11A-C), performing measurement of in-plane vibrations in two directions, where one of the three illumination light beams (11A-C) is common for the two directions of measurement, wherein illuminating the object with the three illumination light beams (11A-C) such that free space is provided at one side of the object (12), providing two out-of-plane illumination light beams (30A-B), measuring vibrations in the object (12) in a third direction, said third direction being out-of-plane, wherein one out-of-plane illumination light beam (30A) illuminates the object (12) through an imaging objective (16) and one out-of-plane illumination light beam (30B) is used as reference beam, exciting the object (12) with one frequency at a time via an excitation unit, and using one or more phase modulators to provide a dynamic phase modulation of one of the in-plane illumination light beams (11A-C) or out-of-plane illumination light beams (30A-B) being used for each recording in each direction, and wherein the same modulator is used for the two in-plane measurements as one of the in-plane illumination light beams (11A-C) is phase modulated, the in-plane illumination light beam (11A-C) being common for both of the in-plane measurements.

2. The method of claim 1, comprising using the same, or a different phase modulator for the measurement in the third out-of-plane direction, wherein the modulator also phase modulates one of the two out-of-plane illumination light beams (30A-B).

3. The method of claim 1, comprising using optical diffusors (14) in the in-plane illumination light beams (11A-C), and moving the diffusors (14) by translation, rotation or a combination of translation and rotation to obtain changes in speckle patterns in the in-plane illumination light beams (11A-C).

4. The method of claim 1, comprising using an optical diffusor (14) in the illumination path for the out-of-plane measurement, and moving the diffusor (14) by translation, rotation or a combination of translation and rotation to obtain changes in speckle pattern in the out-of-plane illumination light beams (30A-B).

5. The method of claim 1, comprising using a polarizing beam splitter (17) and a retarder plate or quarter plate (18) in the illumination path for the out-of-plane measurement for preventing reflections from the objective lens (16) from reaching the detector array (15).

6. The method of claim 1, comprising using a full field detector array (15) for detection of illumination signals in the interferometer.

7. The method of claim 1, comprising performing multiple recordings, where each recording is performed with different levels of intensity in the detector array (15).

8. The method of claim 1, comprising selecting signals used for different points or areas of an imaged area from different recordings with different levels of intensity, for obtaining good or acceptable signal from a majority or all of the points on the object surface.

9. The method of claim 1, comprising performing measurement of vibrations in two or three separate directions using the same modulator signal as temporal reference for the two in-plane and one out-of-plane measurements.

10. The method of claim 1, comprising combining the three- or two-dimensional measurements to achieve a full displacement vector for all points on the imaged surface for object frequency and amplitude used in the two in-plane and one out-of-plane measurements.

11. A method of measuring vibration in two in-plane directions, or two in-plane directions and one out-of-plane direction in an object (12) with an interferometer, comprising the steps of:

providing an object (12) to be measured, providing a source of three in-plane illumination light beams (11A-C), illuminating the object with the three in-plane illumination light beams (11A-C), performing measurement of in-plane vibrations in two directions, where one of the three illumination light beams (11A-C) is common for the two directions of measurement, wherein illuminating the object with the three illumination light beams (11A-C) such that free space is provided at one side of the object (12), using a steady state object excitation with constant amplitude and frequency for the object during the recording in three or two directions.

12. An interferometer for measuring vibration in two in-plane directions, or two in-plane directions and one out-of-plane direction in objects (12), comprising at least one illumination source arranged for emitting three in-plane illumination light beams (11A-C) for measurement of in-plane vibrations in two directions, wherein one of the three in-plane illumination light beams (11A-C) is common for the two directions of measurement, and the three illumination light beams (11 A-C) are configured to provide free space at one side of the object (12), and the common beam provides optical interference with the other beams, and vibrations of the object (12) is controlled by signals from a signal generator.

13. The interferometer of claim 12, wherein the at least one illumination source is arranged for emitting two out-of-plane illumination light beams (30A-B) for measuring vibrations in the object (12) in a third direction that is out-of-plane, wherein one out-of-plane illumination light beam (30A) illuminates the object (12) through an imaging objective (16) and one out-of-plane illumination light beam (30B) is used as reference beam.

14. The interferometer of claim 13, comprising one or more phase modulators for providing dynamic phase modulation of one of the in-plane illumination light beams (11A-C) or out-of-plane illumination light beams (30A-B) being used for each recording in each direction.

15. The interferometer of claim 13, comprising movable optical diffusors (14) for changing speckle patterns in the in-plane illumination light beams (11A-C) or the object out-of-plane illumination light beams (30A-B).

16. The interferometer of claim 12, comprising a full field detector array (15) detecting the reflected light from the object.

17. The interferometer of claim 12, comprising a control unit in operable communication with the light source and a detector for detecting reflected light, the control unit having means or software for one or more of the following:

exiting the object (12) via the excitation unit with one frequency at a time, selecting signals used for different points or areas of an imaged area from different recordings with different levels of intensity, for obtaining good or acceptable signal from all points, or most of the points, on the object surface, performing measurement of vibrations in two or three separate directions using the same modulator signal as temporal reference for the three- or two-dimensional measurements, using a steady state object excitation with constant amplitude and frequency for the object during the recording in three or two directions, combining the three- or two-dimensional measurements to achieve a full three- or two-dimensional displacement vector for all points on the imaged surface for object frequency and amplitude used in the three- or two-dimensional measurements, plotting a full three- or two-dimensional animation of the object surface displacement, and storing data sets for amplitude and phase in all two or three directions.

* * * * *